United States Patent

Clark

[11] Patent Number: 4,483,507
[45] Date of Patent: Nov. 20, 1984

[54] MANIFOLD CROSS-OVER CONTROL VALVE

[75] Inventor: David P. Clark, Battlecreek, Mich.

[73] Assignee: Eaton Corporation, Cleveland, Ohio

[21] Appl. No.: 381,861

[22] Filed: May 25, 1982

[51] Int. Cl.³ .............................................. F16K 1/22
[52] U.S. Cl. .................................... 251/58; 251/286; 251/305; 137/454.6
[58] Field of Search .......................... 137/454.2, 454.6; 251/58, 284, 286, 305, 306, 307, 308, 368

[56] References Cited

U.S. PATENT DOCUMENTS

| | | | |
|---|---|---|---|
| 1,256,466 | 2/1918 | Gally | 251/306 |
| 2,846,999 | 8/1958 | Loewenheim | 251/306 |
| 3,113,587 | 12/1963 | Hendley | 251/284 |
| 3,325,140 | 6/1967 | Kooistra | 251/306 |
| 3,406,903 | 10/1968 | Kidder | 251/305 |
| 3,568,975 | 3/1971 | Obermaier | 251/306 |
| 3,693,935 | 9/1972 | Thauer | 251/305 |
| 3,796,408 | 3/1974 | Sheppard | 251/58 |
| 3,799,434 | 3/1974 | Heidacker | 251/305 |
| 3,857,406 | 12/1974 | Dorling | 251/306 |
| 3,929,314 | 12/1975 | Stratynski | 251/58 |
| 4,176,823 | 12/1979 | Gliatas | 251/306 |
| 4,299,373 | 11/1981 | Troyer | 251/58 |
| 4,363,309 | 12/1982 | Ludwig | 251/305 |

Primary Examiner—Martin P. Schwadron
Assistant Examiner—John A. Rivell
Attorney, Agent, or Firm—Fay & Sharpe

[57] ABSTRACT

The manifold cross-over control valve includes a powdered metal mounting base (10) which is mounted in a bore in a cross-over passage of an intake manifold (B). A frame (40) which extends into the cross-over passage from the mounting base seals against passage around its periphery and defines an exhaust gas aperture (42) therethrough. A pin (70) mechanically fastens the frame to the mounting base. A butterfly plate (80) is mounted on rotatable shaft (90) adjacent the frame for selectively opening and closing the exhaust gas aperture. The pin engages the butterfly plate in its fully open position to limit its rotational movement. A pneumatic actuator (D) is mounted by a bracket (30) to the mounting base for selectively rotating the shaft to control the passage of exhaust gases through the cross-over control valve.

18 Claims, 4 Drawing Figures

U.S. Patent     Nov. 20, 1984     4,483,507
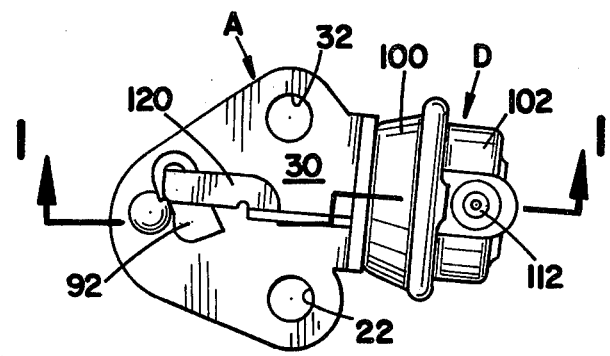
FIG. 3
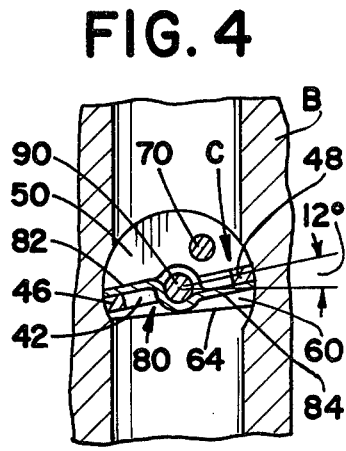
FIG. 4
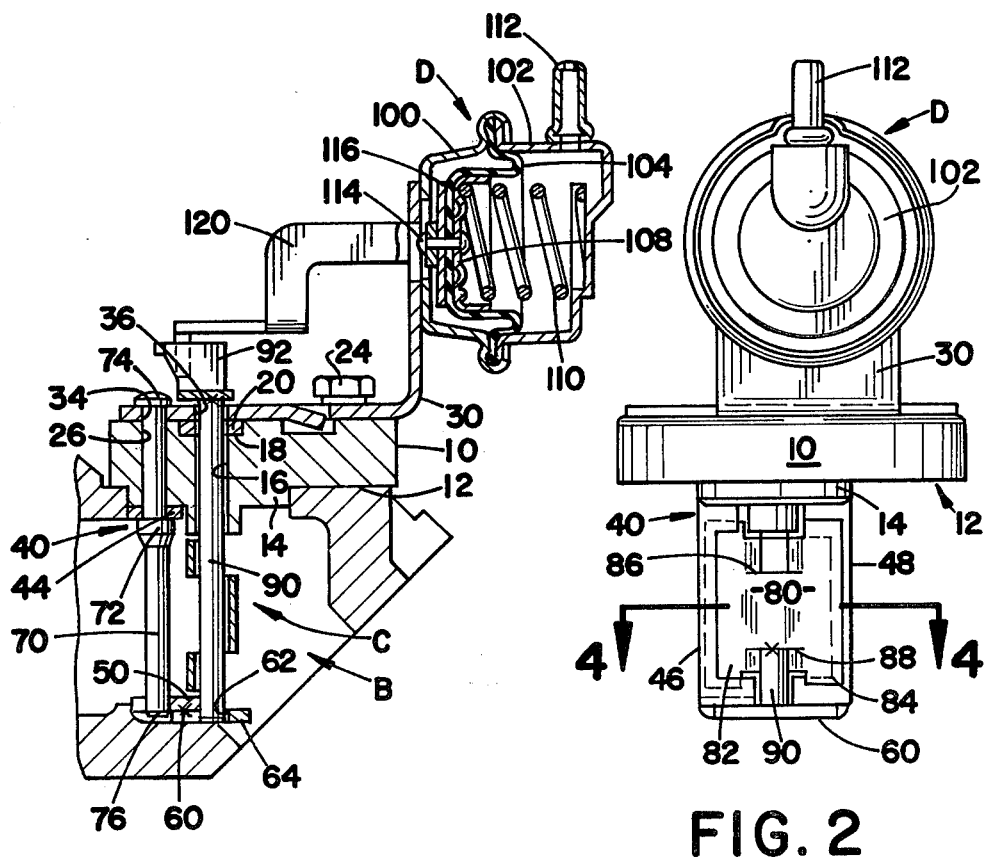
FIG. 1
FIG. 2

MANIFOLD CROSS-OVER CONTROL VALVE

BACKGROUND OF THE INVENTION

The present invention relates to valve assemblies for controlling fluid flow. It finds particular application in controlling a flow of exhaust gases through the intake manifold of an automotive engine to improve cold running performance. It is to be appreciated, however, that the invention has other applications in both automotive and non-automotive areas, such as controlling air recirculation in air conditioners and heaters, ventilation air, and the like.

Heretofore, pneumatically operated flow control valves have been used to control exhaust gas flow through cross-over passages of automotive engines intake manifolds. The prior art cross-over passage control valves were inserted into a circular bore which intersected the cross-over passage. The cross-over valves included a powdered metal or sintered mounting base to which a generally cylindrical or cup-like cage was brazed. The cup-like cage had a pair of large apertures in opposite side walls to allow the exhaust gases to flow in one and out the other. A butterfly plate mounted on a rotatable shaft was positioned within the cage. The inner cylindrical surface of the cage was machined larger in diameter in diametrically opposed quadrants to permit the butterfly plate to be rotated over a 90° arc. By rotating the butterfly plate parallel to the exhaust gas flow, exhaust gases were free to pass through the valve substantially unobstructed. Rotating the butterfly plate transverse to the exhaust gas flow sealed it against the edges of the machined quadrants and blocked the flow of exhaust gases. The butterfly shaft extended through the mounting base in which a TEFLON lip seal blocked exhaust gases from escaping between the base and the butterfly shaft. The butterfly shaft was connected with a lever arm which in turn was connected with a pneumatic actuator that selectively rotated the butterfly plate.

One of the problems with the prior art control valves resides in the difficulty encountered in brazing the cage to the powered metal mounting base. Powered metal parts tend to absorb the braze material.

Another problem with the prior art control valve resides in the corrosion potential of the braze alloy. Under the elevated temperature of exhaust gases, the braze alloy oxidizes causing scaling and fluxing. Oxides of carbon, nitrogen, sulfur, and phosphorous in the exhaust gases tend to react with the brazed metal. Further, chlorides in the exhaust gases can form fluxing salts which fuse at high temperatures. Although high temperature corrosion problems may be overcome using noble metal brazes, such as gold filler, such brazes are unduly expensive.

Another problem arises in the prior art control valve brazes from moisture in the exhaust gases. First, moisture in the exhaust gases contains hydrochloric, sulfuric, and nitric acids. Second, the condensed moisture causes disimilar metal attack at the braze line. This can lead to complete braze separation and stress corrosion cracking at the brazed joint.

Other problems with brazed joints includes brittleness, poor thermal expansion matching with the parent metal, difficulty in nondestructive inspection and quality control, brazing furnace safety, and the cost of brazing furnace maintenance and operation.

The present invention contemplates a new and improved manifold cross-over control valve which overcomes the above referenced problems and others.

SUMMARY OF THE INVENTION

In accordance with the present invention, there is provided a new and improved automotive cross-over control valve. The valve includes a mounting base which is adapted to be mounted in an intake manifold cross-over passage. A peripheral frame is attached to the mounting base by a mechanical fastening means. The peripheral frame is positionable in the intake manifold cross-over passage in sealing engagement with the side walls and defines an exhaust gas aperture therethrough. A valving member is disposed adjacent the peripheral frame for selectively opening and closing the cross-over aperture. An actuating means is operatively connected with the valving member for controlling selective opening and closing of the exhaust gas aperture.

In with another aspect of the invention, there is provided a new and improved control valve. A mounting base and a frame which defines an aperture are fastened together by a mechanical fastener. A plate is operatively connected with a shaft that is rotatably mounted through the mounting base. The plate is disposed adjacent the frame for rotation between a first position in which the aperture is blocked and a second position in which the aperture is at least partially unobstructed.

In accordance with yet another aspect of the present invention, there is provided a control valve which includes a powdered metal mounting base. A frame includes a first frame portion disposed adjacent the mounting base, a second frame portion, and frame leg portions connecting the first and second frame portions such that an aperture through the frame is defined thereby. A mechanical fastener fastens the first frame portion with the mounting base. A bottom plate is operatively connected with the second frame portion. A shaft is rotatably mounted in the mounting base and bottom plate. A butterfly plate is mounted on the shaft for rotation therewith between a first position abutting the frame leg portions to block the aperture and a second position displaced from the frame leg portions to permit flow through the aperture. An actuating means is operatively connected with the shaft for selectively rotating the butterfly plate between the first and second positions.

A primary advantage of the present invention is that it is relatively resistent to corrosion related failures.

Another advantage of the present invention is that it is relatively simple to manufacture and assemble.

Still further advantages of the present invention will become apparent to others upon reading and understanding the followng detailed description.

BRIEF DESCRIPTION OF THE DRAWINGS

The invention may take form in various parts and arrangements of parts. The drawings are only for purposes of illustrating a preferred embodiment of the invention and are not to be construed as limiting the invention.

FIG. 1 is a side sectional view of a control valve in accordance with the present invention in combination with an intake manifold;

FIG. 2 is a side elevational view of the control valve of FIG. 1;

FIG. 3 is a top plan view of the control valve of FIGS. 1 and 2; and,

FIG. 4 is a sectional view through section 4—4 of FIG. 2.

DETAILED DESCRIPTION OF THE PREFERRED EMBODIMENT

With particular reference to FIGS. 1, 2, and 3, the cross-over control valve includes a mounting assembly A which is configured to be mounted in an appropriate valve receiving bore in an intake manifold B. A valving means C is supported by the mounting assembly for selectively opening and closing a passage in the intake manifold. An actuating means D for controlling the valving means is also supported on the mounting assembly.

With particular reference to FIGS. 1 and 2, the mounting assembly A includes a mounting base 10 which is constructed of a powdered metal. The mounting base has a lower surface 12 which is adapted to be mounted on an upper surface of the intake manifold and a downward projecting cylindrical portion 14 which is adapted to be received snugly in a valve receiving bore in the intake manifold. A butterfly shaft receiving bore 16 extends through the mounting base and through the center of the cylindrical portion 14. A well 18 is disposed opposite the annular projection for receiving an exhaust gas sealing means 20. In the preferred embodiment, the sealing means includes a metal washer. A plurality of mounting apertures 22 extend through the mounting plate for receiving means, such as machine screws 24, for securing the mounting base to the intake manifold. A pin receiving opening 26 is disposed adjacent the butterfly shaft receiving bore 16.

An actuator mounting bracket 30 supports the actuator D on the mounting base 10. The mounting bracket defines apertures 32 for receiving the machine screws 24, an aperture 34 in alignment with bore 26, and an aperture 36 through which a butterfly shaft 90 passes. The aperture 36 is dimensioned smaller than the mounting base well 18 such that the sealing means 20 is restrained in the well by the mounting bracket.

With particular reference to FIGS. 1, 2, and 4, a frame 40 defines a gas passage aperture 42 which is selectively opened and closed by the valving means C. The frame includes a semicircular first or upper frame portion 44 which conforms to and is adapted to be connected with the lower surface of the mounting base downward projecting portion 14. A pair of frame legs 46 and 48 extend from the first frame portion to a semicircular second or lower frame portion 50. In the preferred embodiment, the first and second frame portions and the frame legs are of unitary construction to define the exhaust gas passing aperture 42 therethrough.

A bottom plate 60 is dimensioned to be received in the bottom of the intake manifold valve receiving bore. The bottom plate which is welded to the second frame portion 50 defines a butterfly stem receiving bore 62 positioned in alignment with the butterfly receiving bore 16 of the mounting base. In the preferred embodiment, the bottom plate extends only a short distance to a straight rear edge 64 which reduces interference with the flow of exhaust gases around a bend in the exhaust gas passage.

A mechanical fastening means, such as a pin or rivet 70, extends through the mounting base and the first and second frame portions to receive the mounting base and frame together. The pin has a shoulder 72 which engages the first frame portion 44 and a flattened head 74 which engages the mounting bracket 30. A lower end 76 of the pin is welded to the second frame portion 50. In this manner, the mounting bracket and frame are mechanically fastened to the mounting base. As explained in greater detail below, the pin also functions as a stop means to limit the range of movement of the valving means C.

With particular reference to FIGS. 1, 2, and 4, the valving means C includes a butterfly plate 80. The butterfly plate has oppositely disposed vertical wing portions 82 and 84. In the fully closed position, the wing portions contact opposite faces of the frame legs and, in the open position, are disposed generally perpendicular to the frame legs abutting pin 70. The wing portions of the butterfly plate are offset such that the wing portions engage the opposite faces of the frame legs. To accommodate the offset of the butterfly plate, the cross-over control valve is mounted in the intake manifold bore offset by an angle commensurate with the offset of wings. The butterfly plate is stamped with a pair of transverse slots 86 and 88 to recieve a butterfly shaft 90 therethrough. The butterfly plate is welded to the butterfly shaft such that the butterfly plate rotates with the butterfly shaft.

The butterfly shaft 90 is rotatably received at one end in the bottom plate 60 and at the other end in mounting base bore 16. The sealing washer 20 has an inner bore which is machined in close dimensional conformity with the exterior dimension of the butterfly shaft to inhibit gases from passing therebetween. A lever 92 is welded to the other end of the butterfly shaft for rotating the shaft and butterfly plate.

With particular reference to FIG. 1 and 3, the actuating means D is a pneumatic actuator. The pneumatic actuator includes front and rear cover portions 100 and 102 which are welded to the mounting bracket. A diaphragm 104 is crimped peripherally in a annular crimp seam between the front and rear cover portions. A diaphragm retainer plate 106 and a spring positioning plate 108 are disposed on opposite sides of the diaphragm. A biasing means, such as a coil spring 110, is disposed between the spring positioning plate and the actuator cover. A nipple 112 is adapted to receive a vacuum control line for selectively withdrawing the diaphragm and compressing the coil spring. A connecting means 114, such as rivets, connect the diaphragm retainer plate and spring locating plate with a lever actuating arm 120. The lever actuating arm is connected at one end with the diaphragm and pivotally connected at its other end with the lever 92. In the preferred embodiment, the pivotal connection between the lever and the lever actuating arm includes a downward projecting projection on the actuating arm and an aperture defined by the lever.

In the preferred embodiment, the lever and butterfly plate are connected with the butterfly shaft 90 in such a manner that the actuator spring biases the valving means toward a closed position. When the engine is cold, a vacuum is drawn through nipple 112 of the pneumatic actuator. The vacuum retracts the diaphragm retainer plate and actuator arm rotating the lever 92 and the butterfly shaft 90. The butterfly plate is rotated from its closed position abutting the frame legs transverse to the cross-over passage with increasing vacuum. The butterfly plate rotates with the lever until it contacts the pin 70 in an open position substantially parallel to the exhaust gas passage. This allows exhaust gases to be circulated through the intake manifold heating the air drawn into the engine. As the engine warms, the vacuum drawn on the diaphragm is removed and the coil spring 110 returns the butterfly plate to its closed position.

The invention has been described with reference to the preferred embodiment. Obviously, modifications and alterations will occur to others upon reading and understanding the preceding detailed description of the preferred embodiment. It is intended that the invention be construed as including all such alterations and modifications insofar as they come within the scope of the appended claims or the equivalents thereof.

Having thus described a preferred embodiment of the invention, the invention is now claimed to be:

1. A control valve comprising:
   a mounting base;
   a peripheral frame defining an aperture therethrough and extending transverse to the mounting base;
   a bottom plate connected with the frame opposite the mounting base and extending substantially parallel to the mounting base;
   a valving member disposed adjacent the peripheral frame for selectively opening and closing the frame aperture;
   a mechanical fastening means for mechanically fastening the frame with the mounting base, the mechanical fastening means further being operatively connected with the bottom plate, whereby the bottom plate is connected with the mounting base by both the frame and the mechanical fastening means.

2. The control valve as set forth in claim 1 wherein the peripheral frame includes a first frame portion disposed generally parallel to the mounting base, a pair of frame legs disposed generally transverse to the first portion, and a second frame portion integrally connected with the frame legs and connected with the bottom plate, the first frame portion being fastened to the mounting base by the mechanical fastening means.

3. The control valve as set forth in claim 2 wherein the valving member includes a butterfly plate mounted on a rotatable shaft such that the plate is rotatable between a closed position generally parallel to the peripheral frame and an open position generally perpendicular to the peripheral frame.

4. The control valve as set forth in claim 3 wherein in the closed position the frame legs are disposed adjacent opposite faces of the butterfly plate.

5. The control valve as set forth in claim 3 wherein the butterfly plate is larger than the frame aperture such that in the closed position the sealing plate abuts the first and second frame legs in surface to surface contact.

6. The control valve as set forth in claim 3 further including a stop means operatively connected with the frame for limiting rotational movement of the butterfly plate.

7. The control valve as set forth in claim 6 wherein the first frame portion, the second frame portion, and the bottom plate are disposed parallel to each other.

8. The control valve as set forth in claim 1 wherein the mechanical fastening means includes a rivet.

9. The control valve as set forth in claim 1 wherein the mechanical fastening means is disposed adjacent the valving member such that the mechanical fastening means limits movement thereof.

10. A control valve comprising:
    a mounting base;
    a frame which defines an aperture;
    a shaft rotatably mounted through the mounting base;
    a plate operatively connected with the shaft for rotation therewith, the plate being disposed adjacent the frame for rotation between a first position in which the aperture is blocked and a second position in which the aperture is at least partially unobstructed; and,
    a pin for fastening the frame and mounting base together, the pin extending adjacent the plate to limit the rotational movement thereof.

11. The control valve as set forth in claim 10 wherein the pin has a shoulder portion for engaging the frame and a head portion for engaging the mounting base.

12. The control valve as set forth in claim 10 wherein the frame includes a first frame portion which is fastened to the mounting base by the pin, a second frame portion, and a pair of spaced frame leg portions extending between the frame first and second portions, the first and second frame portions and the frame leg portions defining the aperture therebetween.

13. The control valve as set forth in claim 12 wherein the pin is operatively connected with the second frame portion.

14. The control valve as set forth in claim 12 further including a bottom plate which is journalled to receive an end of the shaft rotatably therein, the bottom plate being operatively connected with the second frame portion.

15. The control valve as set forth in claim 12 further including an actuator mounting bracket operatively connected with the mounting base and a pneumatically controlled actuator mounted on the bracket, the actuator being operatively connected with the shaft for controlling the rotational position of the shaft.

16. The control valve as set forth in claim 15 wherein the pin connects the bracket with the mounting base.

17. An automotive cross-over control valve comprising:
    a powdered metal mounting base which is adapted to be mounted in an intake manifold cross-over passage;
    a frame having a periphery generally in conformity with a transverse cross section of the intake manifold cross-over passage and including a first frame portion disposed adjacent the mounting base, a second frame portion, and frame leg portions connecting the first and second frame portions such that an exhaust gas aperture through the frame is defined thereby;
    a bottom plate operatively connected with the second frame portion;
    a shaft rotatably mounted in the mounting base and bottom plate;
    a butterfly plate mounted on the shaft for rotation therewith between a first position abutting the frame leg portions to close the exhaust gas aperture and a second position displaced from the frame leg portions to open the exhaust gas aperture;
    a mechanical fastener for mechanically fastening the first frame portion and the mounting base, the mechanical fastener engaging the butterfly plate in the second position to limit rotational movement thereof; and,
    actuating means operatively connected with the shaft for selectively rotating the butterfly plate between the first and second positions.

18. The automotive cross-over control valve as set forth in claim 17 wherein the frame is offset by an offset angle relative to the intake manifold cross-over passage such that in the first position the butterfly plate is transverse to the intake manifold cross-over passage.

* * * * *